(12) United States Patent
Berceau et al.

(10) Patent No.: US 11,777,600 B2
(45) Date of Patent: Oct. 3, 2023

(54) TERMINAL FOR OPTICAL COMMUNICATION BY LASER SIGNALS

(71) Applicant: AIRBUS DEFENCE AND SPACE SAS, Toulouse (FR)

(72) Inventors: Paul Berceau, Toulouse (FR); Adrien Barbet, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 18/016,854

(22) PCT Filed: Jul. 8, 2021

(86) PCT No.: PCT/FR2021/051261
§ 371 (c)(1),
(2) Date: Jan. 18, 2023

(87) PCT Pub. No.: WO2022/018343
PCT Pub. Date: Jan. 27, 2022

(65) Prior Publication Data
US 2023/0231627 A1    Jul. 20, 2023

(30) Foreign Application Priority Data

Jul. 20, 2020 (FR) ..................................... 20 07584

(51) Int. Cl.
*H04B 10/112* (2013.01)
*H04B 10/118* (2013.01)

(52) U.S. Cl.
CPC ......... *H04B 10/112* (2013.01); *H04B 10/118* (2013.01)

(58) Field of Classification Search
None
See application file for complete search history.

(56) References Cited

U.S. PATENT DOCUMENTS

| 7,277,641 | B1 | 10/2007 | Gleckman | |
|---|---|---|---|---|
| 7,289,736 | B1 * | 10/2007 | Graves | G02B 26/06 398/119 |
| 7,587,141 | B2 * | 9/2009 | Fisher | H04B 10/118 398/128 |
| 9,041,936 | B2 * | 5/2015 | Flanders | F21V 9/20 356/497 |

(Continued)

FOREIGN PATENT DOCUMENTS

| CN | 102185659 | 4/2014 |
| CN | 109728855 | 5/2019 |

OTHER PUBLICATIONS

International Search Report for PCT/FR2021/051261, dated Nov. 12, 2021, 4 pages.

(Continued)

Primary Examiner — Jai M Lee
(74) Attorney, Agent, or Firm — Nixon & Vanderhye P.C.

(57) ABSTRACT

A terminal (100) for optical communication by laser signals including a matrix image sensor used as a tracking and acquisition detector (2). The matrix image sensor is used simultaneously to check that a portion of the laser signals received by the terminal are injected into an optical fibre (1). A spectral filter element (22) is associated with the matrix image sensor to allow such a combination of functions.

12 Claims, 2 Drawing Sheets

(56) References Cited

U.S. PATENT DOCUMENTS

| | | | |
|---|---|---|---|
| 9,876,567 B2 * | 1/2018 | Dickson | H04B 10/118 |
| 10,439,716 B2 * | 10/2019 | Miller | H04B 10/1123 |
| 10,627,576 B2 * | 4/2020 | Kim | H04B 10/1125 |
| 11,405,106 B2 * | 8/2022 | Rein | H04B 10/40 |
| 11,588,556 B1 * | 2/2023 | Conrad | H04B 10/548 |
| 11,652,549 B2 * | 5/2023 | Perlot | H04B 10/118 |
| | | | 398/45 |
| 2010/0158536 A1 * | 6/2010 | Vaillon | H04B 10/118 |
| | | | 398/139 |
| 2022/0137309 A1 | 5/2022 | Hulin et al. | |
| 2022/0345221 A1 * | 10/2022 | Mitchell | H04B 10/1121 |

OTHER PUBLICATIONS

Written Opinion of the ISA for PCT/FR2021/051261, dated Nov. 12, 2021, 6 pages.

* cited by examiner

TERMINAL FOR OPTICAL COMMUNICATION BY LASER SIGNALS

This application is the U.S. national phase of International Application PCT/FR2021/051261, filed Jul. 8, 2021, which designated the U.S. and claims priority to French patent application FR 20 07584, filed Jul. 20, 2020, the entire contents of each of which are hereby incorporated by reference.

Field of the Invention

The present description relates to a terminal and method for optical communication by laser signals. More specifically it relates to such terminal and such method where laser signals which are received are routed to a reception photodetector via an optical fibre.

Description of Related Art

The use of free-space propagating laser signals, i.e. communication laser signals which are not guided inside optical fibres, for transmitting data over very large distances is well known, in particular for spatial applications. It requires using optical terminals for which the reception and transmission directions are precisely controlled. This control ensures in particular that each terminal actually receives the signals which are transmitted by the other one, even though both terminals may have relative movement. This relative movement may, in particular, be large when at least one of both terminals is located on board a satellite in orbit, for example around the Earth. The other terminal may then be located on board another satellite also in orbit, or be situated on the ground on Earth, or even be located on board an aircraft in flight or any other vehicle or ship. For each terminal, the instantaneous separation which is applied between the direction of transmission thereof and the direction along which it receives laser signals coming from the other terminal is commonly called point-ahead offset.

Technical Problem

An important issue for using the technology of optical communication by laser signals consists of reducing the bulk and weight of the terminals.

Part of this issue relates in particular to routing within a terminal the optical communication laser signals which are received by this terminal to a reception photodetector.

Another part of the issue consists in reducing the number of optical sensors, and more generally the number of optical components, which are necessary for the operation of each terminal.

In this situation, an object of the invention is then to propose a new terminal structure for optical communication by laser signals, including the use of specific optical components, in order to provide a solution to the aforementioned issue.

BRIEF SUMMARY OF THE INVENTION

To achieve at least one of these objects or another, a first aspect of the invention proposes a new terminal for optical communication by laser signals which comprises a tracking and acquisition detector, of matrix image sensor type in which photosensitive elements are arranged at intersections of rows and columns inside a detection surface. This terminal is arranged for, during a use, reception of first laser signals emitted by a source which is external to the terminal, and transmission of second laser signals to this external source. Furthermore, the terminal is arranged so that part of the first laser signals and part of the second laser signals are incident on the detection surface of the tracking and acquisition detector. Adjustments of the orientation of the terminal relative to the reception direction and the point-ahead offset are thus possible by using detection signals which are produced by at least some of the photosensitive elements of the tracking and acquisition detector.

Additionally, in order to recover data which are transmitted by the external source, the invention terminal is further arranged in order, during the use thereof, to inject another portion of the first laser signals into an optical fibre, through an input end of this optical fibre. To this purpose, the terminal is adapted so that during the use thereof:

a radiation called a calibration radiation is led in the optical fibre and exits through the input end thereof, and an image of the input end of the optical fibre is formed on the detection surface of the tracking and acquisition detector with the calibration radiation.

In that way, the tracking and acquisition detector is also adapted for ensuring that the so-called other part of the first laser signals, i.e. the part of the received laser signals which is intended for a reception photodetector, are actually injected into the optical fibre through the input end thereof. Such combination of functions for the tracking and acquisition detector is particularly advantageous in order to reduce the bulk, weight and cost of the terminal.

According to an additional feature of the invention, the terminal further comprises at least one spectral filtering element which is disposed so that at least the part of the second laser signals and the calibration radiation which then reach the detection surface of the tracking and acquisition detector pass therethrough. This at least one spectral filtering element has a transmission value for a wavelength of the second laser signals which is lower than an average transmission value of this same spectral filtering element which is effective over a spectral detection interval of the tracking and acquisition detector for the calibration radiation. Thanks to using such spectral filtering element, it is possible to avoid saturation of the tracking and acquisition detector at each location in the detection surface thereof where arrives the part of the second laser signals which is used for the tracking function, while also ensuring that this tracking and acquisition detector has sufficient sensitivity for simultaneously detecting the calibration radiation. In that way, all the functions of the tracking and acquisition detector in the invention terminal, i.e. the adjustment of the orientation of the terminal relative to the reception direction, the point-ahead offset adjustment and also the injection of the received laser signals into the guiding optical fibre at the reception photodetector, are compatible with being implemented with the tracking and acquisition detector and a reduced number of additional optical components.

Several locations are alternatively possible for at least one spectral filtering element which is added by the invention, all along an optical path portion which is shared by the calibration radiation and the part of the second laser signals which is intended to reach the tracking and acquisition detector. In particular, the at least one spectral filtering element may be located in front of or against the detection surface of the tracking and acquisition detector, i.e. in particular between this detection surface and an imaging element which is used to form the image of the input end of the optical fibre on this detection surface.

Advantageously, the transmission value of the at least one spectral filtering element for the wavelength of the second laser signals may be lower than one hundredth, preferably lower than one thousandth, of the average transmission value thereof which is effective over the spectral detection interval of the tracking and acquisition detector for the calibration radiation. It is thus possible for the tracking and acquisition detector to detect the part of the second laser signals and the calibration radiation with sufficient sensitivity but without being saturated, even if the part of the second laser signals has much larger intensity than that the calibration radiation.

In preferred embodiments of the invention, at least one of the following additional features may be optionally reproduced, alone or in combination of several of them:

the at least one spectral filtering element which is used according to the invention in the terminal may be made up of one filter, or an assembly of several combined filters;

the at least one spectral filtering element which is used according to the invention in the terminal may be of multilayer interference filter type;

the at least one spectral filtering element which is used according to the invention in the terminal may be of the band rejection filter type, and may be adapted so that the wavelength of the second laser signals is within a rejection interval of this at least one spectral filtering element, and so that at least one wavelength of the calibration radiation is outside the rejection interval;

the at least one spectral filtering element may be further adapted so that a wavelength of the first laser signals is also outside the rejection interval; and the terminal may be further arranged to receive, during use thereof, beacon signals from the external source, and may be adapted so that part of these beacon signals is also incident on the detection surface of the tracking and acquisition detector. In this case, the at least one band-rejection spectral filtering element may be further adapted so that a wavelength of the beacon signals is also outside the rejection interval.

In embodiments of the invention which are particularly advantageous, the terminal may further comprise:

the reception photodetector which is sensitive to the wavelength of the first laser signals, and which is optically coupled to an output end of the optical fibre, opposite to the input end, so as to produce electric reception signals as a function of the first laser signals which are received by the terminal; and an optical amplifier which is efficient for the first laser signals, and which is located on an optical path of the here-named other part from these first laser signals between the input end of the optical fibre and the reception photodetector.

Then, the optical amplifier may produce, during the use of the terminal, an amplified spontaneous emission radiation, and part of this amplified spontaneous emission radiation may constitute the calibration radiation by exiting through the input end of the optical fibre. In alternative implementations of the invention, the calibration radiation may be produced by an ancillary optical source which is coupled to the optical fibre so that this radiation produced by the ancillary source exits through the input end of the optical fibre.

In particular, numerical values conforming to the following specifications may be adopted:

the wavelength of the first laser signals may be between 1540 nm (nanometres) and 1545 nm;

the wavelength of the second laser signals may be between 1550 nm and 1555 nm;

a spectral range of the calibration radiation may contain the interval which extends from 1530 nm to 1560 nm;

when the at least one spectral filtering element is of the band rejection type, the rejection interval thereof may be comprised between about 1550 nm and about 1575 nm; and if applicable, the wavelength of the beacon signals may be between 1580 nm and 2000 nm.

A second aspect of the invention proposes a communication method comprising the following steps:

providing a terminal for optical communication by laser signals, comprising a tracking and acquisition detector, of matrix image sensor type in which photosensitive elements are arranged at intersections of rows and columns inside a detection surface, the terminal being arranged to, during a use of the terminal:

receiving first laser signals emitted by a source which is external to the terminal, directing a part of the first laser signals to the detection surface of the tracking and acquisition detector, injecting another part of the first laser signals into an optical fibre through an input end of this optical fibre; and transmitting second laser signals to outside of the terminal, and transmitting, using the terminal, the second laser signals to the external source;

while the second laser signals are being transmitted:

directing a part of these second laser signals to the detection surface of the tracking and acquisition detector, simultaneously directing, to the detection surface of the tracking and acquisition detector, a radiation called calibration radiation which is led in the optical fibre and which exits through the input end of that optical fibre, and forming an image of the input end of the optical fibre on the detection surface of the tracking and acquisition detector with the calibration radiation.

According to the invention, the method further comprises the additional following step:

before the part of the second laser signals which is directed to the detection surface of the tracking and acquisition detector and the calibration radiation which forms the image of the input end of the optical fibre reach the detection surface of the tracking and acquisition detector, reducing a value of the quotient of the intensity of the part of the second laser signals to the average intensity of the calibration radiation which is effective for detecting this calibration radiation by the tracking and acquisition detector.

Advantageously, the value of the quotient of the intensity of the part of the second laser signals which is directed to the detection surface of the tracking and acquisition detector to the average intensity of the calibration radiation which forms the image of the input end of the optical fibre and which is effective for detecting this calibration radiation by the tracking and acquisition detector, may be reduced by a factor greater than one hundred, preferably greater than one thousand.

This reduction of the quotient may be performed by using at least one spectral filtering element, such that the terminal for optical communication by laser signals which is provided by the invention method conforms to the first invention aspect as presented above.

BRIEF DESCRIPTION OF THE DRAWINGS

The features and advantages of the present invention will appear more clearly in the following detailed description of non-limiting implementation examples with reference to the attached figures among which.

DETAILED DESCRIPTION OF THE INVENTION

For clarity sake, the dimensions of the elements which are shown in these figures do not correspond either to actual dimensions or to ratios of actual dimensions. Furthermore, some of these elements are only shown symbolically.

Figure 1:
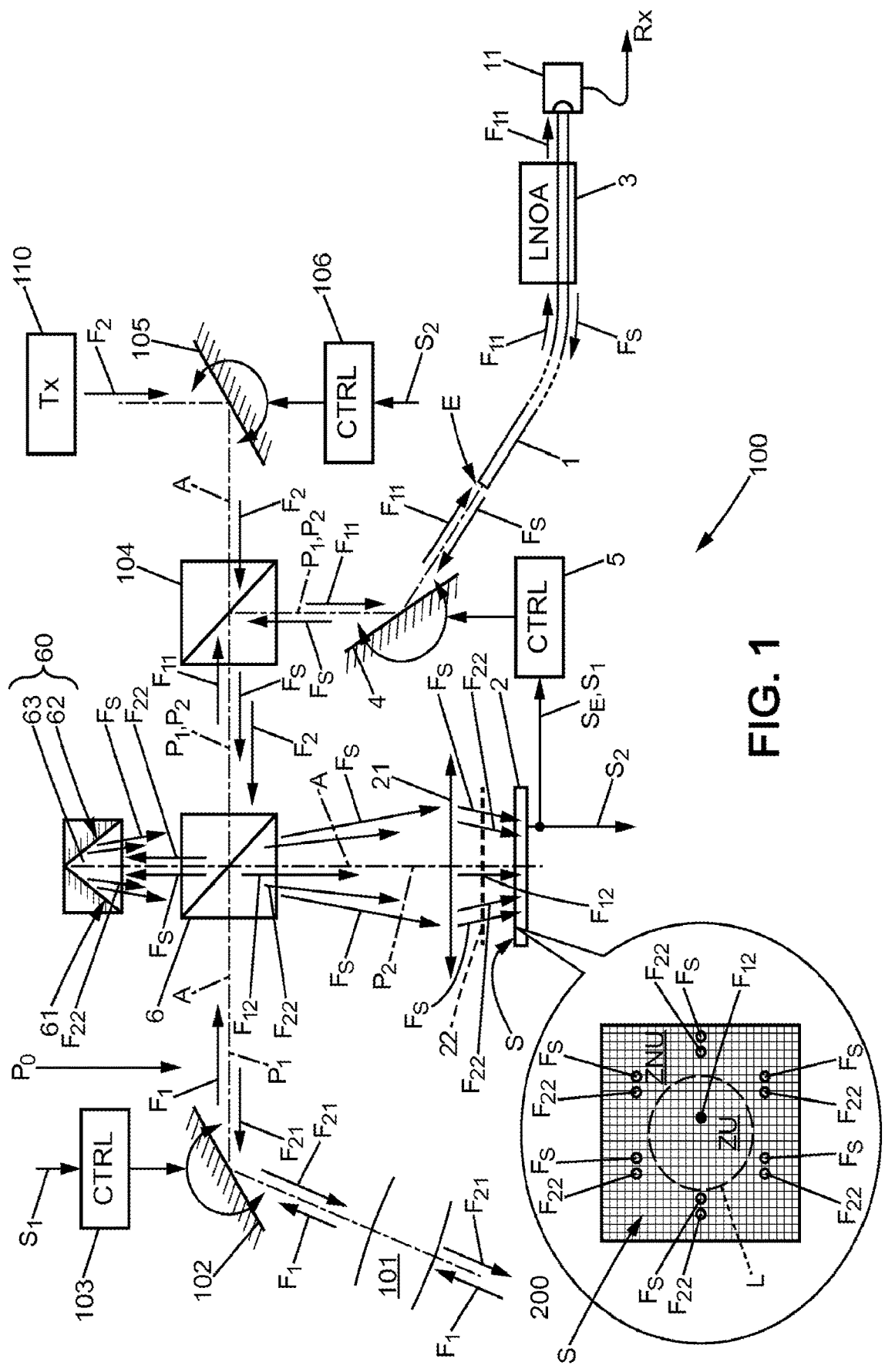
FIG. 1 is an optical diagram of a terminal for optical communication by laser signals which conforms to the invention.

In FIG. 1, reference number 100 designates the terminal for optical communication by laser signals in its entirety, and $F_1$ designates the beam of the laser signals which are received by this terminal 100 while originating from a distant terminal 200. These laser signals received by the terminal 100 were called first laser signals in the general part of the description, and the terminal 200 was called external source. The laser signals of the beam $F_1$ are routed inside the terminal 100 by a reception optical path which terminates at a photodetector 11 which may be an ultrafast photodiode. Resulting reception electrical signals are noted Rx in the figure. The path of the received laser signals in the reception optical path, between an optical entrance $P_0$ of the terminal 100 and the photodetector 11, comprises a first optical path $P_1$ and an optical fibre 1.

Other laser signals, which are transmitted by the terminal 100 to the distant terminal 200, constitute a beam part $F_{21}$ and were called second laser signals in the general part of the description. They are transmitted inside of the terminal 100 by an optical transmission path.

The terminals 100 and 200 may each be on board a different satellite, or else one may be on board a satellite and the other one may be installed on the surface of the Earth or of another planet.

The reference numbers listed below have the following meanings:

- 101: radiation collector optics of the terminal 100, which may serve both for collecting the beam $F_1$ originating from the distant terminal 200, and transmitting the beam portion $F_{21}$ towards this distant terminal 200. For example, the collector optics 101 may be a telescope;
- 102: pointing device of the terminal 100, which may possibly combine a fine pointing device and a coarse pointing device. For simplicity sake, the pointing device 102 is shown in the form of a rapid response orientable mirror, or "fast steering mirror," but it may also be combined with part of an attitude and orbit control system for a satellite on board which the terminal 100 is located;
- 103: controller of the pointing device 102, noted CTRL;
- 104: device for coupling the transmission optical path and the reception optical path of the terminal 100. This may be a biprism operating by separation based on polarization, commonly referred to as PBS for "Polarization Beam Splitter." In this case, polarization control components effective for the beam parts which pass through the coupling device 104 are used, although they are not shown in the figure;
- 105: calibration device for a transmission direction of the terminal 100, i.e. for the direction of the beam part $F_{21}$. This device 105 is optional, without direct connection with the invention, and may comprise a variable orientation mirror;
- 106: controller for the calibration device 105, for adjusting the transmission direction the terminal 100; and
- 110: source of the laser signals which are transmitted by the terminal 100 to the distant terminal 200, noted Tx.

The optical path which is comprised between the laser signal source 110 and the radiation collection optics 101 constitutes the transmission optical path of the terminal 100. It is shared with the reception optical path between the radiation collection optics 101 and the coupling device 104.

The operation of each of the components 101 to 110 and cooperation thereof within the terminal 100 are known the person skilled in the art. In particular, the pointing device 102 is intended to compensate for vibrations to which the terminal 100 may be subject, and which would deviate the pointing direction thereof from an intended transmission direction so that the laser signals which are transmitted by this terminal 100 (i.e. the part of the beam $F_{21}$ downstream from the collection optics 101) arrive precisely at the distant terminal 200. To this purpose, the controller 103 receives detection signals $S_1$, which identify the instant reception direction of the laser signals that originate from the distant terminal 200 (i.e. the beam $F_1$). This function of compensating for the vibrations, with very short response time, is different from that of a variable deviation device 4 which will be described later, and for which the reaction time may be longer.

The source 110 produces the laser signals to be transmitted by the terminal 100 to the distant terminal 200 in the form of a beam $F_2$. The coupling device 104 is arranged such that the beam $F_2$ of the laser signals to be transmitted by the terminal 100 passes through a biprism 6. The biprism 6 constitutes a beam splitter operating by intensity division, commonly referred to as BS for "Beam Splitter," but other types of beam dividers may be used equivalently. The beam $F_2$ is then divided by the biprism 6 into two beam parts: the first beam part $F_{21}$ which is transmitted through the radiation collection optics 101 and intended for the distant terminal 200, and another beam part $F_{22}$ which is directed towards a matrix image sensor 2.

The matrix image sensor 2 may for example be of CMOS type. It may be combined with an imager 21, for example a convergent lens, so that the detection surface S of the matrix image sensor 2 is located in a focal plane of the imager 21. Thus, each collimated radiation beam which is incident on the imager 21 is focused into one or more illumination point(s) on the detection surface S of the matrix image sensor 2. The position(s) of these illumination points then represent the direction of incidence of the beam.

The direction of the beam part $F_{21}$, upstream from the pointing device 102 relative to the direction of propagation of the transmission laser signals, may be intended to be coincident with an optical axis of the terminal 100. To this purpose, the controller 106 locks the calibration system 105 as a function of the detection signals $S_2$ which are produced by the matrix image sensor 2 based on the beam part $F_{22}$, so that the direction of the beam part $F_{21}$ is superposed with the optical axis of the terminal 100 upstream from the pointing device 102. In the embodiment which is described here, the beam part $F_{22}$ is directed towards the matrix image sensor 2 by being reflected by a trihedral reflector assembly 60.

According to a preferred constitution, the reflector assembly 60 may be formed by three flat mirrors 61, 62 and 63, which are each limited between two straight edges and concurrent along an angle α. The flat mirrors 61, 62 and 63 are joined along the edges thereof, in order to form a symmetric trihedral angle at the vertex α. The angle α of each mirror 61, 62 and 63 may be selected greater than 90°

(degrees), for example equal to 90.5°. It may be adjusted as a function of the distances between the optical components used, sizes thereof, focal lengths thereof, etc. Under these conditions, a radiation beam which is incident into the trihedron of the mirrors 61, 62 and 63 is retroreflected in the form of six beams which have respective directions distributed symmetrically around an average reflection direction, this latter being symmetric of the direction of the incident beam with respect to the central axis of the trihedron.

When such trihedral reflector assembly 60 is used, the beam part $F_{22}$ lights six points on the detection surface S of the matrix image sensor 2 (see points referenced $F_{22}$ in the inset in FIG. 1). These six points of the beam part $F_{22}$ are located at the vertices of a regular hexagon whose centre corresponds to the direction of the beam $F_2$ upstream from the biprism 6. When the calibration controller 106 performs a lock-in of the device 105, the detection hexagon of the beam part $F_{22}$ is centred on the point of intersection of the optical axis of the terminal 100 with the detection surface S. The calibration controller 106 may determine the direction of the beam part $F_{22}$ from signals $S_2$ representative of the detection hexagon. Such a calibration function is described in patent application EP 9 172 199 published under number EP 2 173 042 and titled "Optical transmission-reception unit with controllable transmission direction".

The biprism 6 divides the beam part $F_1$ of the laser signals received by the terminal 100 into a first beam part $F_{11}$ which is intended to arrive at the reception photodetector 11, and a second beam part $F_{12}$ which is intended to arrive at the matrix image sensor 2. The terminal 100 may be arranged so that the part $F_{11}$ of the beam $F_1$ of the received laser signals passes through the biprism 6 without deviation. The part $F_{12}$ of the beam $F_1$ is reflected by the biprism 6 directly to the matrix image sensor 2. The point of the detection surface S where the beam part $F_{12}$ is detected represents the reception direction of the beam $F_1$ by the terminal 100, and thus also the direction of the beam part $F_{11}$. This detection point of the beam $F_{12}$ is identified by the detection signals $S_1$ which are produced by the matrix image sensor 2.

Under the operating conditions of the terminal 100 which were just described, the offset between the respective directions of the beam part $F_{21}$ and the beam $F_1$ is the point-ahead angle which is ordered to the terminal 100. This point-ahead angle is characterized by the detection signals $S_1$ and $S_2$, representing the offset in two dimensions between the centre of the hexagon and the six points in the detection surface S which are lit by the beam part $F_{22}$ on the one hand, and the point which is lit by the beam part $F_{12}$ on the other hand. It may be produced by orienting the input optical field of the radiation collection optics 101 using the pointing device 102, so that the impact point of the beam part $F_{12}$ onto the detection surface S of the matrix image sensor 2 is at the location that corresponds to the opposite of the intended point-ahead angle. Alternatively, the point-ahead offset may be produced by using the device for the calibration of the transmission direction 105. Thus, the matrix image sensor 2 serves as tracking and acquisition detector.

An injection system is used in the terminal 100 in order to inject the beam part $F_{11}$ into the optical fibre 1. The function of this injection system is to compensate for transverse offsets which may affect the position of the input end E of the optical fibre 1 and also, possibly, the point-ahead angle of the terminal 100 compared to the beam part $F_{11}$. It thus guarantees that the part $F_{11}$ of the beam $F_1$ is incident on the input end E of the optical fibre 1 so that this beam part $F_{11}$ is next routed by the optical fibre 1, by guided propagation inside thereof, to the photodetector 11. The optical fibre 1 may be single-mode for the radiation of the beam part $F_{11}$. In such case, the input end E may have a diameter of order of 10 μm (micrometer) for a wavelength of received laser signals of order of 1.5 μm.

To this end, the first optical path $P_1$, connects the optical entrance $P_0$ of the terminal 100 to the input end E of the optical fibre 1 will being oriented in the direction of the optical fibre 1. The optical path $P_1$ is intended to be followed by the part $F_{11}$ of the beam $F_1$ of the received laser signals. For clarity sake of the figure, a focusing lens for the beam part $F_{11}$, in the focal plane of which the input end E of the optical fibre 1 is located, is not shown since use thereof is well known to the person skilled in the art.

A second optical path, denoted $P_2$, is provided for the radiation which is used for identifying the position of the input end E of the optical fibre 1. The second optical path $P_2$ connects the input end E of the optical fibre 1 to the matrix image sensor 2, towards this sensor 2.

Each of the optical paths $P_1$ and $P_2$ may be followed by the involved radiation beam(s) without the direction of each beam being fixed by the optical path followed. The injection system controls the direction of each radiation beam inside the optical path $P_1$, $P_2$ where this beam propagates.

The radiation which is dedicated to identifying the position of the input end E of the optical fibre 1 was called calibration radiation in the general part of the present description. The beam of this radiation is noted $F_S$ in the figure.

According to a particularly advantageous embodiment of the invention, the optical fibre 1 transmits the part $F_{11}$ of the beam $F_1$ of the laser signals received to an optical amplifier 3, and then it transmits the resulting amplified beam part $F_{11}$ to the photodetector 11. The amplifier 3, noted LNOA (low-noise optical amplifier) may be of erbium-doped fibre amplifier (EDFA) type. As is well known, such amplifier produces radiation through amplified spontaneous emission (ASE), one part of which is guided inside the optical fibre 1 towards its input end E. The optical fibre 1 is efficient for leading such amplified spontaneous emission radiation from the amplifier 3 to the input end E of the fibre. After leaving through the input end E, this part of the amplified spontaneous emission radiation constitutes the calibration radiation beam $F_S$. It propagates in the optical path $P_2$ towards the matrix image sensor 2 in order to identify the position of the end E of the optical fibre 1, by imaging on the detection surface S of the matrix image sensor 2.

In a compact implementation of the terminal 100, both optical paths $P_1$ and $P_2$ may be coupled by the biprism 6, in order to be superimposed between this biprism 6 and the end E of the optical fibre 1. The calibration radiation beam $F_S$ may thus be first reflected by the biprism 6 towards the reflector assembly 60, and then retroreflected thereby, and then pass through the biprism 6 again without being deviated, through the imager 21 towards the matrix image sensor 2. In this way, points on the detection surface S where the beam $F_S$ is detected represent the position of the input end E of the optical fibre 1. As for the beam part $F_{22}$, because of the trihedral reflector assembly 60, the beam $F_S$ is detected at six points which are located at the vertices of another regular hexagon. These six detection points of the calibration beam $F_S$ are identified by detection signals $S_E$ which are also produced by the matrix image sensor 2. The central point of this additional hexagon identifies the position of the input end E of the optical fibre 1.

Thus, the matrix image sensor 2 simultaneously receives the part $F_{12}$ of the beam $F_1$ of the laser signals which are received by the terminal 100, the part $F_{22}$ of the beam $F_2$ of the laser signals to be transmitted by the terminal 100, and the calibration radiation beam $F_S$. This combination of functions for the matrix image sensor 2 participates in the optimization of the terminal 100 which is provided by the invention. Since the trihedral reflector assembly 60 is not involved in the characterization of the direction of the part $F_{11}$ of the beam $F_1$, this direction is characterized by a single detection point on the detection surface S of the matrix image sensor 2. As already indicated, this point is illuminated by the beam part $F_{12}$, representative of the direction of the beam part $F_{11}$ which is intended to be directed onto the input end E of the optical fibre 1. To this purpose, the detection point of the beam part $F_{12}$ is intended to be coincident with the centre of the hexagon of detection points of the calibration radiation beam $F_S$.

A variable deviation device 4 is further arranged on the optical path $P_1$, for example in the path part which is shared by the optical paths $P_1$ and $P_2$, but without this being indispensable. In the structure of the terminal 100 which is described here, the device 104 for coupling the transmission and reception optical paths is located between the biprism 6 and the variable deviation device 4 in the optical paths $P_1$ and $P_2$. The variable deviation device 4 is distinct from the device 105 for calibration of the transmission direction of the terminal 100, and also distinct from the pointing device 102. The variable deviation device 4 may be comprised of a dedicated flat mirror which is mounted on a support with two axes of rotation, so as to be able to reflect in a variable direction the part $F_{11}$ of the beam $F_1$ of the received laser signals. For the specific case where the variable orientation mirror of the device 4 simultaneously reflects the part $F_{11}$ of the beam $F_1$ and the calibration radiation beam $F_S$, as shown by FIG. 1, they have identical directions of propagation, but propagate in opposite directions, between the device 4 and the input end E of the optical fibre 1 on the one hand and between the device 4 and the biprism 6 on the other hand, when the mirror of the device 4 is oriented so that the beam part $F_{11}$ is incident on the input end E of the optical fibre 1. The inset in FIG. 1 shows the six points in the detection surface S of the matrix image sensor 2 which receive the calibration radiation during an operation of the injection system. The direction of the beam $F_S$ such as produced by the orientable mirror of the device 4 corresponds to the barycentre of these six points, which may be determined by the injection controller 5 from detection signals $S_E$, those indicating the respective positions of the six points in the detection surface S. The calculation to be performed by the injection controller 5 in order to determine the barycentre of the six points representative of the direction of the beam $F_S$ based on the detection signals $S_E$ is obvious and accessible to the person skilled in the art. Because of the trihedral configuration of the reflector assembly 60, with angles at the vertex different from 90°, the detection signals $S_1$ produced by the matrix image sensor 2 which identify the direction of the beam $F_1$ of the laser signals received at the optical entrance $P_0$, cannot be swapped with the detection signals $S_E$, also produced by matrix image sensor 2 but which identify the position of the end E of the optical fibre 1.

Then, if the central axis of the reflector assembly 60 coincides with the optical axis of the terminal 100 at the output of the biprism 6, the beam part $F_{12}$ and the average direction of the six parts of the beam $F_S$ which are generated by the reflector assembly 60, both intersect the detection surface S of the matrix image sensor 2 at a single detection point. Conversely, a gap between the detection point of the beam part $F_{12}$ and the barycentre of the six detection points of the beam $F_S$ on the detection surface S of the matrix image sensor 2 means that the part $F_{11}$ of the beam $F_1$ of the received laser signals does not intersect the input end E of the optical fibre 1.

An injection controller 5, noted CTRL, serves to lock the orientation of the orientable mirror of the device 4 to the detection signals $S_E$. It is designed for controlling the orientation of this mirror so as to reduce an offset between an apparent direction in the mirror, in which the input end E of the optical fibre 1 is located, as identified by the detection signals $S_E$, and the direction of the beam part $F_{11}$ such as detected by the matrix image sensor 2 using the beam part $F_{12}$. Based on the detection signals $S_E$ and $S_1$, the injection controller 5 commands the orientation of the mirror of the device 4 so as to reduce an offset between the respective directions of the beam $F_S$ and the beam part $F_{11}$, until producing a superposition of these directions. In this way, it is possible to compensate for transverse offsets of the beam part $F_{11}$ relative to the end E of the optical fibre 1. Such transverse offsets may be due to temperature variations which affect at least part of the injection system, and/or due to changes in the apparent direction of the beam $F_1$ of the laser signals received at the optical entrance $P_0$, and/or due to any other cause. In this way, the beam part $F_{11}$ of the laser signals which are received by the terminal 100 is continuously injected into the optical fibre 101 through the end E thereof.

The matrix image sensor 2 therefore participates in the following three functions: controlling the pointing device 102, controlling the calibration device 105, and controlling the deviation device 4, respectively for compensating for vibrations which affect the terminal 100 as a whole, for controlling the transmission direction of the terminal 100, and for controlling the injection of the received laser signals into the guiding optical fibre towards the reception photodetector. Such combination of functions is particularly advantageous for reducing the dimensions, weight and energy consumption of the optical communication terminal 100.

During operation of the terminal 100, the direction of the beam $F_1$ of the laser signals which are received by the terminal 100, such as detected by the matrix image sensor 2 in the form of a single point of illumination, is contained in a limited area of the detection surface S of this sensor 2. This limited zone is conjugated with the set of reception directions which are contained in the entrance optical field of the radiation collection optics 101. It is noted ZU and was called useful zone for the tracking function in the general part of the present description. In contrast, the points of a part of the detection surface S which is complementary to the zone ZU useful for the tracking function are not optically conjugated with any reception direction through the collection optics 101. This part of the detection surface S which is complementary to the zone ZU is noted ZNU in the inset of FIG. 1. The limit L is the boundary between the zones ZU and ZNU. Then, it is advantageous that the angle α of the trihedron of the reflector assembly 60 be selected so that the six points of the detection surface S that are illuminated by the calibration radiation beam $F_S$, and also that the six other points that are illuminated by the transmission beam part $F_{22}$, are in the zone ZNU. Thus, the detection signals $S_1$ produced by the matrix image sensor 2 which identify the direction of the beam $F_1$ of the laser signals received by the terminal 100 are always separated from the detection signals $S_E$, also produced by matrix image sensor 2, but which identify the position of the end E of the optical fibre 1. Likewise, the detection signals $S_1$ are thus always separated from the detection signals $S_2$ produced by the matrix image sensor 2 and which identify the direction of the beam $F_2$ of the laser signals transmitted by the terminal 100.

During this operation of the terminal 100, each of the six detection points of the beam part $F_{22}$ receives a radiation intensity which is much greater than that of each of the six detection points of the calibration radiation beam $F_S$. For the specific embodiment of the terminal 100 described here, the radiation intensity which reaches the six detection points of the beam part $F_{22}$ is also much greater than that which arrives at the detection point of the beam part $F_{12}$. This disproportion in the intensity levels is due to the high power of the source 110 of the laser signals which are intended to be transmitted to the exterior by the terminal 100. A risk of saturation of the matrix image sensor 2 results at the detection points of the beam part $F_{22}$, which could reduce the precision with which the locations can be identified where this beam part $F_{22}$ is incident in the detection surface S. To eliminate this risk, the present invention proposes adding at least one spectral filtering element, which attenuates the beam part $F_{22}$ relative to the calibration radiation beam $F_S$, and possibly also relative to the beam part $F_{12}$. This filtering element may be comprised of a band rejection filter 22, which may be placed before the detection surface S. Such filter 22 may be located alternatively between the imager 21 and the matrix image sensor 2, or between the biprism 6 and the imager 21, or between the reflector assembly 60 and the biprism 6, or even between the coupling device 104 of the transmission and reception paths and the biprism 6. The filter 22 may be implemented in the form of a stack of thin layers, which produces by interference effect a spectral rejection interval for a transmission use of this filter. Commonly, such interference filter may be comprised of at least twenty superposed thin layers, even at least one hundred superposed thin layers, depending on the specification of this filter. Advantageously, the filter 22 may be selected to have a factor over 100, preferably over 1000, between some of the transmission values thereof which are effective outside of the rejection interval and others of the values thereof which are effective inside the rejection interval. The filter 22 is then selected so that the wavelength of the source 110 of the laser signals to be transmitted is inside its rejection interval and at least a part of the calibration radiation which constitute the beam $F_S$ is outside the rejection interval. Preferably, the wavelength of the beam $F_1$ of the laser signals which are received by the terminal 100 and originating from the external source 200, and also the beacon signals which can be transmitted by the external source 200 during an acquisition phase, are also outside the band rejection interval.

Figure 2:
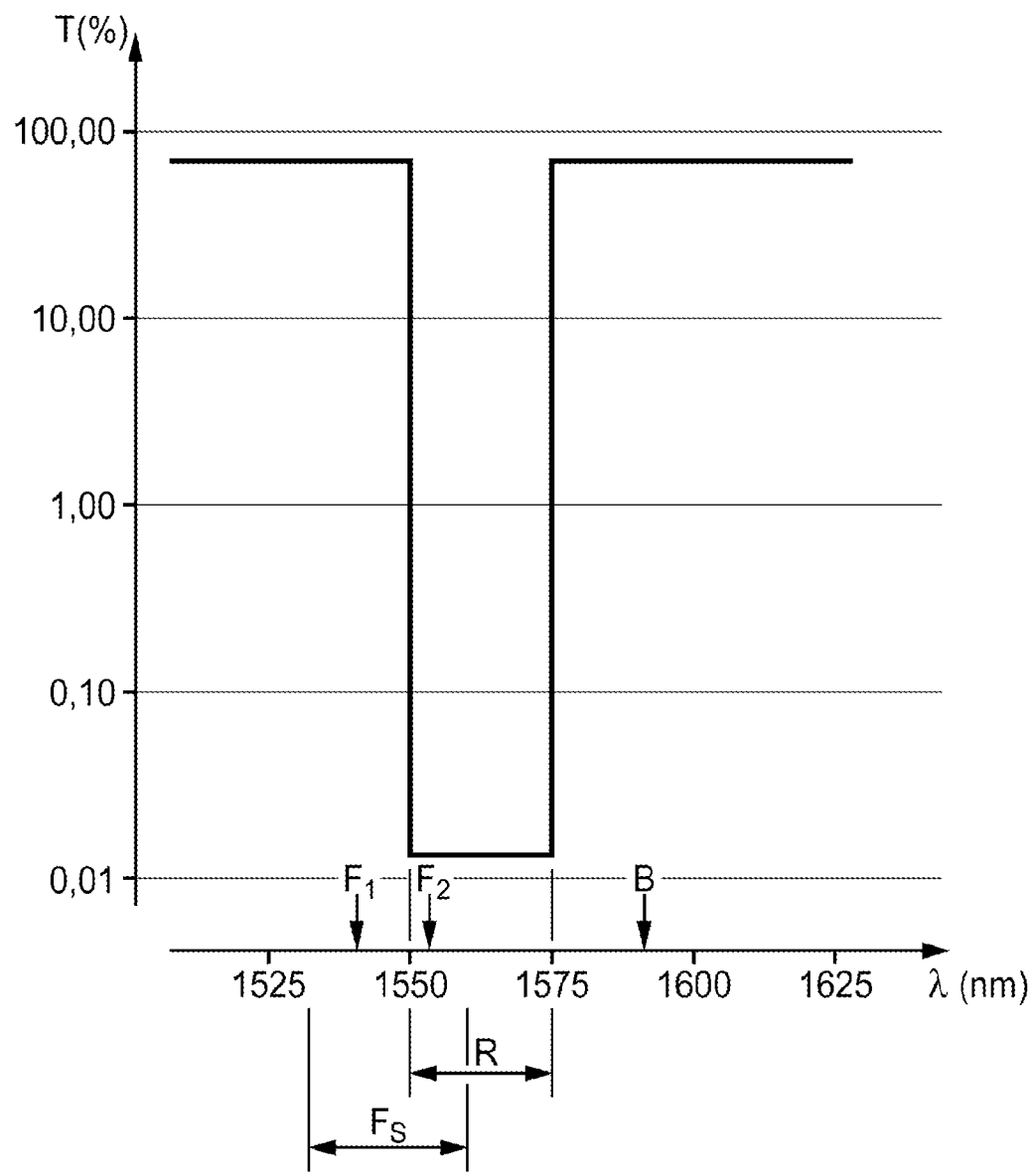
FIG. 2 is a transmission diagram of a spectral filter which may be used in the terminal of FIG. 1 for implementing the invention.

In the transmission spectral diagram of the filter 22 as shown in FIG. 2, the vertical axis references in logarithmic scale spectral transmission values, labelled T and expressed in percentages, and the horizontal axis references the wavelength values labelled $\lambda$. R designates the rejection interval which extends from about 1550 nm to about 1575 nm. The spectral transmission values T of the filter 22 in the interval R are typically less than 0.05%. They are higher than 95% between 1525 nm and 1545 nm, and also between 1580 nm and 1625 nm. Then, the following values may be used for a session of optical communication by laser signals between the terminal 100 and the external source 200:

wavelength of the source 110, which produces the beam $F_2$: about 1552 nm, more generally comprised between 1550 nm and 1555 nm;

spectral extension of the radiation of amplified spontaneous emission, which produces the calibration radiation beam $F_S$: from less than 1530 nm to more than 1560 nm;

wavelength of the laser signals received by the terminal 100, which constitute the beam $F_1$: about 1542 nm; more generally comprised between 1540 nm and 1545 nm; and wavelength of the beacon signals received by the terminal 100 from the external source 200: about 1590 nm.

In the diagram from FIG. 2, the afore-mentioned wavelengths are designated respectively and in the order previously listed by $F_2$, $F_S$, $F_1$ and B for the beacon signals. The spectral sensitivity interval of the matrix image sensor 2 extends at least from 1525 nm to 1625 nm, and this sensor is assumed to have a detection yield which is roughly constant over this spectral interval.

It is understood that the invention may be reproduced by modifying secondary aspects of the optical communication terminal which was described in detail above, while maintaining at least some of the indicated advantages. In particular, optical components which perform functions similar to those of the components described, may be used alternatively to those latter. Furthermore, the system used for injecting the part of the received laser signals which is intended to reach the reception photodetector into the optical fibre, may be implemented according to a different structure from that described in detail. Finally, all the numerical values which were given were only for exemplifying purpose, and may be changed according to the mission to which the optical communication terminal is dedicated.

The invention claimed is:

1. A terminal for optical communication by laser signals, comprising a tracking and acquisition detector, of matrix image sensor type in which photosensitive elements are arranged at intersections of rows and columns inside a detection surface, the terminal being arranged to, during a use of said terminal, receiving first laser signals emitted by a source which is external to said terminal, and transmitting second laser signals to said external source, and so that a part of the first laser signals and a part of the second laser signals are incident on the detection surface of the tracking and acquisition detector, the terminal being further arranged to, during the use of said terminal, injecting another part of the first laser signals into an optical fibre, through an input end of said optical fibre, and the terminal being adapted so that, during the use:

a radiation called calibration radiation is led in the optical fibre and exits through the input end of said optical fibre, and an image of the input end of the optical fibre is formed on the detection surface of the tracking and acquisition detector using the calibration radiation, the terminal further comprises at least one spectral filtering element which is disposed so that at least the part of the second laser signals and the calibration radiation which then reach the detection surface of the tracking and acquisition detector pass through the at least one spectral filtering element, said at least one spectral filtering element having a transmission value for a wavelength of the second laser signals which is lower than an average transmission value of said at least one spectral filtering element, effective over a spectral detection interval of the tracking and acquisition detector for the calibration radiation.

2. The terminal according to claim 1, wherein the transmission value of the at least one spectral filtering element for the wavelength of the second laser signals is lower than one hundredth of the average transmission value of said at least one spectral filtering element which is effective over the spectral detection interval of the tracking and acquisition detector for the calibration radiation.

3. The terminal according to claim 1, wherein the at least one spectral filtering element is of multilayer interference type filter.

4. The terminal according to claim 1, wherein the at least one spectral filtering element is of band rejection type filter, and is adapted so that the wavelength of the second laser signals is within a rejection interval of said at least one spectral filtering element, and so that at least one wavelength of the calibration radiation is outside the rejection interval.

5. The terminal according to claim 4, wherein the at least one spectral filtering element is further adapted so that a wavelength of the first laser signals is outside the rejection interval.

6. The terminal according to claim 4, wherein the terminal is further arranged to receive, during the use of said terminal, beacon signals from the external source, and is adapted so that part of said beacon signals is incident on the detection surface of the tracking and acquisition detector, and
wherein the at least one spectral filtering element is further adapted so that a wavelength of the beacon signals is also outside the rejection interval.

7. The terminal according to claim 6, further adapted so that, during the use of said terminal:
the wavelength of the beacon signals is in a range of 1580 nm to 2000 nm.

8. The terminal according to claim 4, wherein the rejection interval of the at least one spectral filtering element is comprised in a range of 1550 nm to 1575 nm.

9. The terminal according to claim 1, further comprising:
a reception photodetector which is sensitive to a wavelength of said first laser signals, and which is optically coupled to an output end of the optical fibre, opposite to the input end, so as to produce electric reception signals as a function of the first laser signals received by the terminal; and
an optical amplifier which is efficient for said first laser signals, and which is located on an optical path of said other part of the first laser signals between the input end of the optical fibre and the reception photodetector,
wherein the optical amplifier produces, during the use of the terminal, an amplified spontaneous emission radiation, and part of said amplified spontaneous emission radiation constitutes the calibration radiation by exiting through the input end of the optical fibre.

10. The terminal according to claim 1, adapted so that, during the use of said terminal:
the wavelength of the first laser signals is in a range of 1540 nm to 1545 nm;
the wavelength of the second laser signals is in a range of 1550 nm to 1555 nm; and
a spectral range of the calibration radiation contains the interval which extends from 1530 nm to 1560 nm.

11. A communication method comprising the following steps:
providing a terminal for optical communication by laser signals, comprising a tracking and acquisition detector, of matrix image sensor type in which photosensitive elements are arranged at intersections of rows and columns inside a detection surface, the terminal being arranged to, during a use of said terminal:
receiving first laser signals emitted by a source which is external to said terminal,
directing a part of said first laser signals to the detection surface of the tracking and acquisition detector,
injecting another part of the first laser signals into an optical fibre through an input end of said optical fibre;
transmitting second laser signals to outside of the terminal, and
transmitting, using the terminal, the second laser signals to the external source (200); and
while the second laser signals are being transmitted:
directing a part of said second laser signals to the detection surface of the tracking and acquisition detector,
simultaneously directing, to the detection surface of the tracking and acquisition detector, a radiation called calibration radiation which is led in the optical fibre and which exits through the input end of said optical fibre, and
forming an image of the input end of the optical fibre on the detection surface of the tracking and acquisition detector with the calibration radiation,
wherein the method further comprises:
before the part of the second laser signals which is directed to the detection surface of the tracking and acquisition detector and the calibration radiation which forms the image of the input end of the optical fibre reach said detection surface of the tracking and acquisition detector, reducing a value of a quotient of an intensity of said part of the second laser signals to an average intensity of said calibration radiation which is effective for detecting said calibration radiation by the tracking and acquisition detector.

12. The method according to claim 11, wherein the value of the quotient of the intensity of the part of the second laser signals which is directed to the detection surface of the tracking and acquisition detector to the average intensity of the calibration radiation which forms the image of the input end of the optical fibre and which is effective for detecting said calibration radiation by the tracking and acquisition detector, is reduced by a factor greater than one hundred.

* * * * *